United States Patent
Mathews et al.

(10) Patent No.: US 7,417,535 B2
(45) Date of Patent: Aug. 26, 2008

(54) APPARATUS AND METHOD FOR CONVERTING A LOW VOLTAGE AC WIRING CIRCUIT TO A HIGH SPEED DATA COMMUNICATIONS LINK

(75) Inventors: David K. Mathews, Dallas, TX (US); Alfred C. Griffin, Hillsboro, TX (US)

(73) Assignee: RadioShack Corporation, Fort Worth, TX (US)

( * ) Notice: Subject to any disclaimer, the term of this patent is extended or adjusted under 35 U.S.C. 154(b) by 232 days.

(21) Appl. No.: 11/218,669

(22) Filed: Sep. 2, 2005

(65) Prior Publication Data

US 2007/0052531 A1     Mar. 8, 2007

(51) Int. Cl.
G08B 1/08 (2006.01)
G08B 5/00 (2006.01)
H04M 11/04 (2006.01)

(52) U.S. Cl. .................. 340/533; 340/538; 340/538.15; 340/539.25; 340/286.11; 340/326; 340/330; 348/14.05; 348/14.04

(58) Field of Classification Search ............. 340/533, 340/538, 330
See application file for complete search history.

(56) References Cited

U.S. PATENT DOCUMENTS

| | | | |
|---|---|---|---|
| 4,697,166 A | 9/1987 | Warnagiris et al. | 340/310 |
| 5,428,388 A * | 6/1995 | von Bauer et al. | 348/155 |
| 2004/0085205 A1 | 5/2004 | Yeh | 340/540 |
| 2004/0130624 A1 * | 7/2004 | Ryley et al. | 348/155 |
| 2004/0132489 A1 * | 7/2004 | Ryley et al. | 455/556.1 |

OTHER PUBLICATIONS

White Paper "Home Networking Over Power Lines," (c) 2002, 8 pp.; Cogency Semiconductor Inc., Toronto, ON, Canada; www.cogency.com.

Application Brief "CS1100 HomePlug , (tm), 1.O Compliant MAC/PHY Block," copyright 2002, 2 pp.; Cogency Semiconductor Inc., Toronto, ON, Canada; www.cogency.com.

Product Brief, "INT51X1 Single Chip Power Packet, (tm) Tranceiver," copyright 2002, 2 pp.; Intellon Corporation, Ocala FL 34482; www.intellon.com.

Product Brief, INT 6000 HomePlug (R) AV High-Speed Powerline Solution, (c) 2005, 2pp.; Intellon Corporation, Ocala, FL 34482; www.intellon.com.

Product Description, "Samsung Video Door Phone," (c) 2006; 3 pp.; Smarthome, Inc., Irvine, CA 92606-5027; www.smarthouse.com.

(Continued)

*Primary Examiner*—Donnie L Crosland
(74) *Attorney, Agent, or Firm*—Whitaker, Chalk, Swindle & Sawyer, LLP; Stephen S. Mosher

(57) ABSTRACT

An apparatus for converting a low voltage alternating current (AC) wiring circuit to a high speed data communications link, comprising a primary coupling circuit and a secondary coupling circuit. The apparatus provides low voltage AC power to a data device and couples data signals between the data device and the AC power line via the converted low voltage AC wiring circuit. An example is provided for retrofitting a door chime system to a high speed data link such as a video camera system.

13 Claims, 3 Drawing Sheets

OTHER PUBLICATIONS

Product Description, "2.4 GHz Wireless Door Chime," Dec. 2004; 3 pp.; Shenzhen Youjin Electronic Co. Ltd., Shenzhen City, Guangdong Province, China; www.yojn.com.

Product Descriptions, "Doorbell Video Intercom" and "Audio Video Security Monitoring Kit," Jan. 2005; 2pp.; Swann Company; www.swann.com.

Product Brief, "Piranha Powerline Networking Chipset," (c) 2001; pp.; Cogency Semiconductor Inc., Toronto, ON Canada, www.cogency.com.

Product Brief, "Power Packet (tm) INT5130 Chipset," Jul. 2004; 3pp.; Intellon Corporation, Ocala, FL, 34482, www.intellon.com.

* cited by examiner

APPARATUS AND METHOD FOR CONVERTING A LOW VOLTAGE AC WIRING CIRCUIT TO A HIGH SPEED DATA COMMUNICATIONS LINK

BACKGROUND OF THE INVENTION

1. Field of the Invention

The present invention generally relates to data communications and, more particularly, to converting a low voltage AC wiring circuit such as doorbell, or other low voltage control or signaling wiring to a data communications link.

2. Background and Description of the Prior Art

A conventional doorbell system in a residence is very limited in its functionality. If someone in the house wishes to determine the identity of a person at an entrance to a residence, the resident must typically go to the entrance and personally investigate, unless the residence is equipped with an intercom system to enable two-way communication with the person outside the entrance. One problem with the conventional system is that the person inside the house must be present at the door to determine the identity of the visitor. In addition, the conventional system cannot determine the identity of the visitor without disclosing the fact that someone is present inside the house. Further, even with an intercom facility it is not always possible to ascertain with certainty that the person outside the entrance is a person the resident would want to admit inside the house or even to have a conversation with the person.

One prior art solution is to install a closed circuit television system camera at the entrance connected via wiring to a closed circuit TV monitor located within the residence. Such systems tend to be bulky and expensive, and often require technical expertise to install correctly. Another disadvantage of the closed circuit television system is the requirement for additional wiring which may be a substantial expense in many kinds and sizes of residences.

Another prior art solution comprises a unit resembling a desktop telephone having a handset and a display and a second unit resembling a small intercom type unit having a small TV camera, a speaker microphone and a operating control. The camera unit is mounted adjacent the entrance to the residence and the desktop unit is located somewhere within the residence. The two units are connected via dedicated wiring and allows monitoring the entrance and permits two-way communication with the person at the entrance who has rung the doorbell. The call button on the outdoor camera unit may activate an indoor door chime, the camera, and an intercom if it is desired to do so. Even if the visitor does not press the call button but merely knocks on the door, the system has a monitor mode whereby the person inside can activate the camera to provide a visual image of the visitor. This video door phone has the same disadvantage the conventional closed circuit television systems does in that it also requires special wiring and expertise to connect the camera unit to the inside desktop monitoring unit.

Video door chime products similar to those described in the preceding paragraph are also available in versions having a wireless interface between an entry station outside a residence and a receiving station within the residence. While these units provide an alternative to a system that requires the installation of wiring or cabling, such systems tend to be expensive or subject to interference effects with the RF transmission, of the type often encountered with cordless phone products. Such interference can be more troublesome with wireless units because of the greater bandwidth demands placed on a video monitoring system.

What is needed is a system for providing communication between a visitor at an entrance to a residence or business that overcomes the disadvantages noted above and which may be easily installed by a homeowner of average mechanical skills.

SUMMARY OF THE INVENTION

Accordingly, there are described herein systems configured to utilize the existing wiring of a conventional doorbell system, including an adapter for configuring a doorbell wiring circuit for use with any data communications device, so that the system or device will be easy to install in existing residences. Such a system would be inexpensive and readily marketed as a turnkey system to enable homeowners of average mechanical skills to retrofit the doorbell wiring of existing residences for enhanced utility.

Thus, an apparatus and method are disclosed for converting any type of low voltage alternating current (AC) wiring circuit to a high speed data communications link, comprising a primary coupling circuit and a secondary coupling circuit. The primary circuit provides low voltage AC power to the low voltage wiring circuit and couples data signals between the low voltage AC wiring circuit and the high voltage AC power line. The secondary circuit provides low voltage AC power to the data communications device and couples high speed data signals between the data device and the low voltage AC wiring circuit. This embodiment enables converting any type of low voltage AC, control or signaling circuit found in a typical residence, such as used in a door chime, home security, or HVAC system, to a high speed data communications link.

In another aspect, an exemplary apparatus for converting a doorbell wiring circuit to a data communications link is provided comprising an entry unit coupled to the doorbell wiring circuit at an entrance of a building. Data signals are coupled from a video camera at the entry unit via the doorbell wiring circuit to a transceiver unit coupled to the doorbell wiring circuit at terminals of a door chime unit in the building. The transceiver further comprises a receiving circuit, for receiving the signal output from the doorbell wiring circuit and converting the signal output to wireless data, and a transmitting circuit for transmitting the wireless data to a monitor unit within the building.

DETAILED DESCRIPTION OF THE INVENTION

Figure 1:
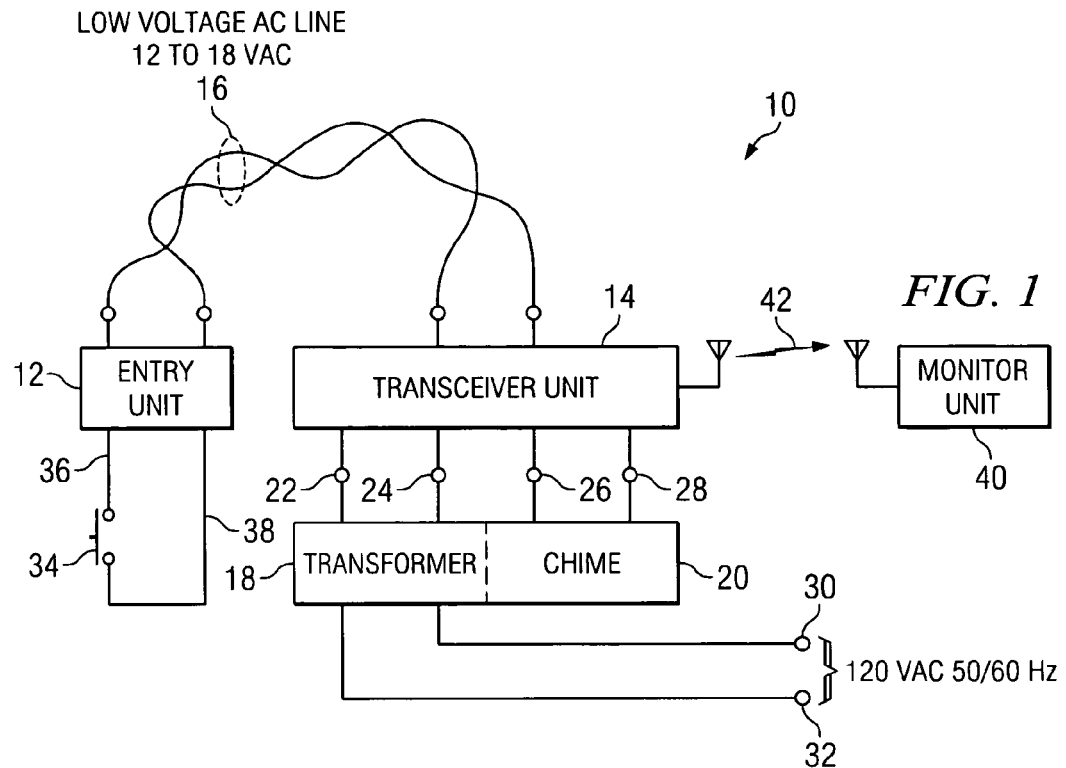
FIG. 1 illustrates a block diagram of one embodiment of the present invention.
Figure 3:
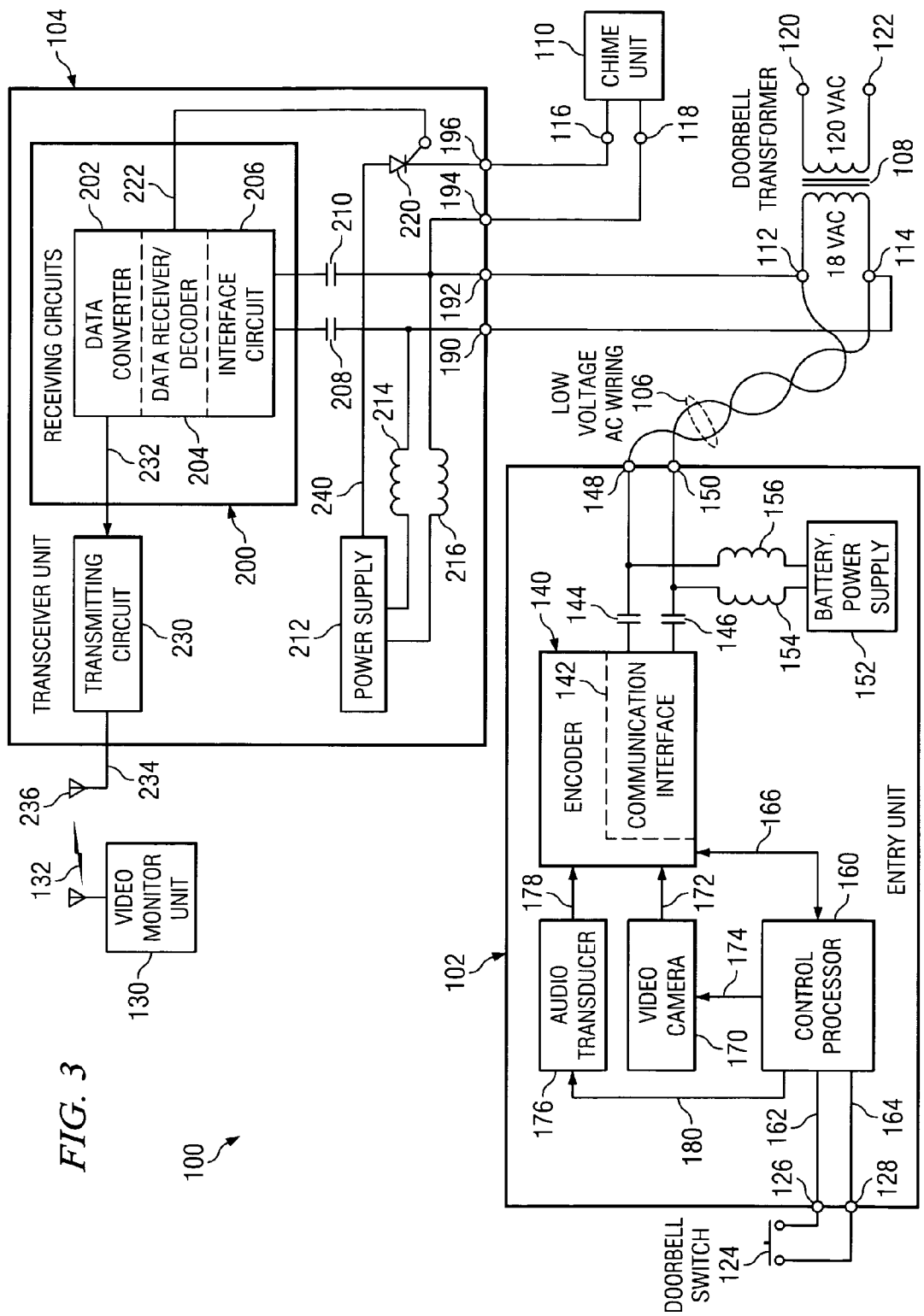
FIG. 3 illustrates a block diagram of one implementation of the embodiment of FIG. 1 adapted to a residential door chime system.

The invention described herein is presented in two forms. The embodiments illustrated in the accompanying drawings have several features to solve the problem of providing a video doorbell or a high speed data communications link on an existing low voltage AC wiring circuit in a residence. The described apparatus may be retrofitted without additional wiring. Briefly stated, the invention maximizes the use of the existing low voltage wiring, supplementing it with devices to provide the additional communications paths needed. In the embodiment of FIGS. 1 and 3, a system for converting the wiring for activating a door chime or doorbell to a video monitoring system comprises two separate units, an entry station which replaces or connects to the original doorbell button, and a transceiver unit which is installed at or near the existing chime assembly within the residence. The transceiver receives the data from the entry station or unit and transmits the data to a video monitor unit via a wired or a wireless communications link. The video monitor unit may illustratively be a conventional television set equipped with a set top box, a base phone with a video display, a cordless phone having a video display, or a personal computer equipped with a receiving unit that couples to the PC via a USB terminal or other monitor device coupled via a power line link such as HomePlug®, for example. Alternatively, a wireless link may be used such as Wi-Fi, Bluetooth, or the Ultra-Wideband (UWB) Technology that the Federal Communications Commission (FCC) has recently authorized at very limited power levels for use in the band from 3.1 GHz to 10.6 Ghz, for example.

Figure 2:
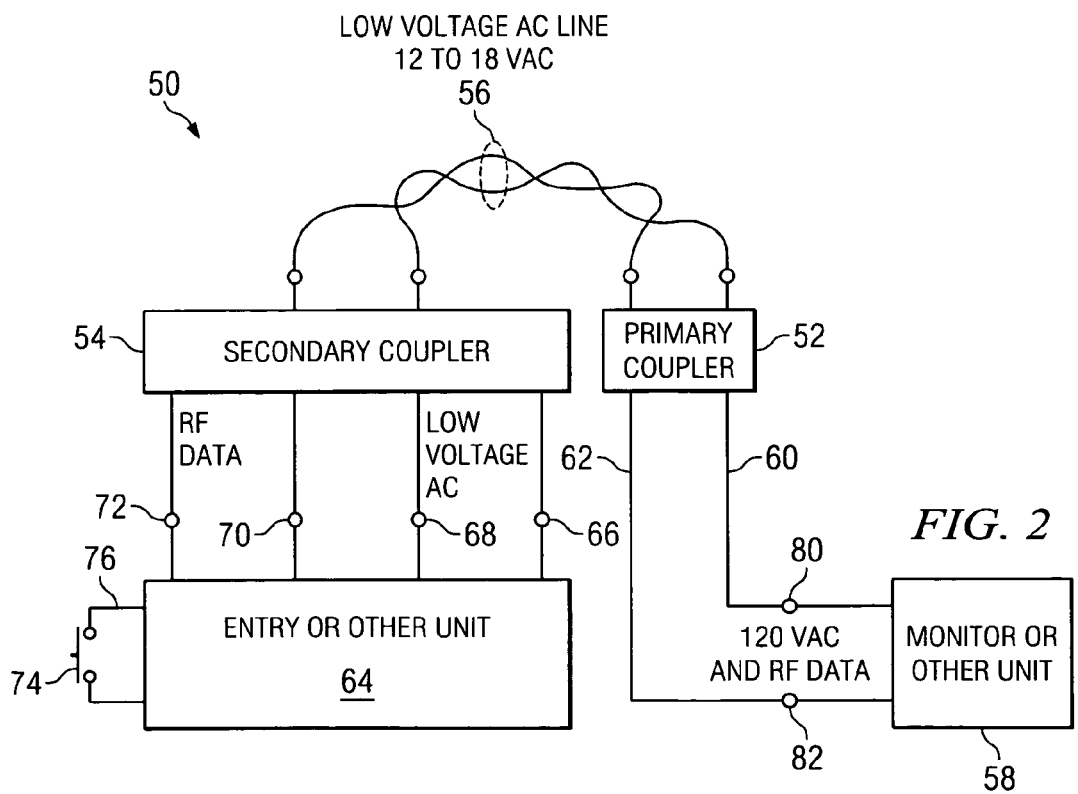
FIG. 2 illustrates a block diagram of a second embodiment of the present invention.
Figure 4:
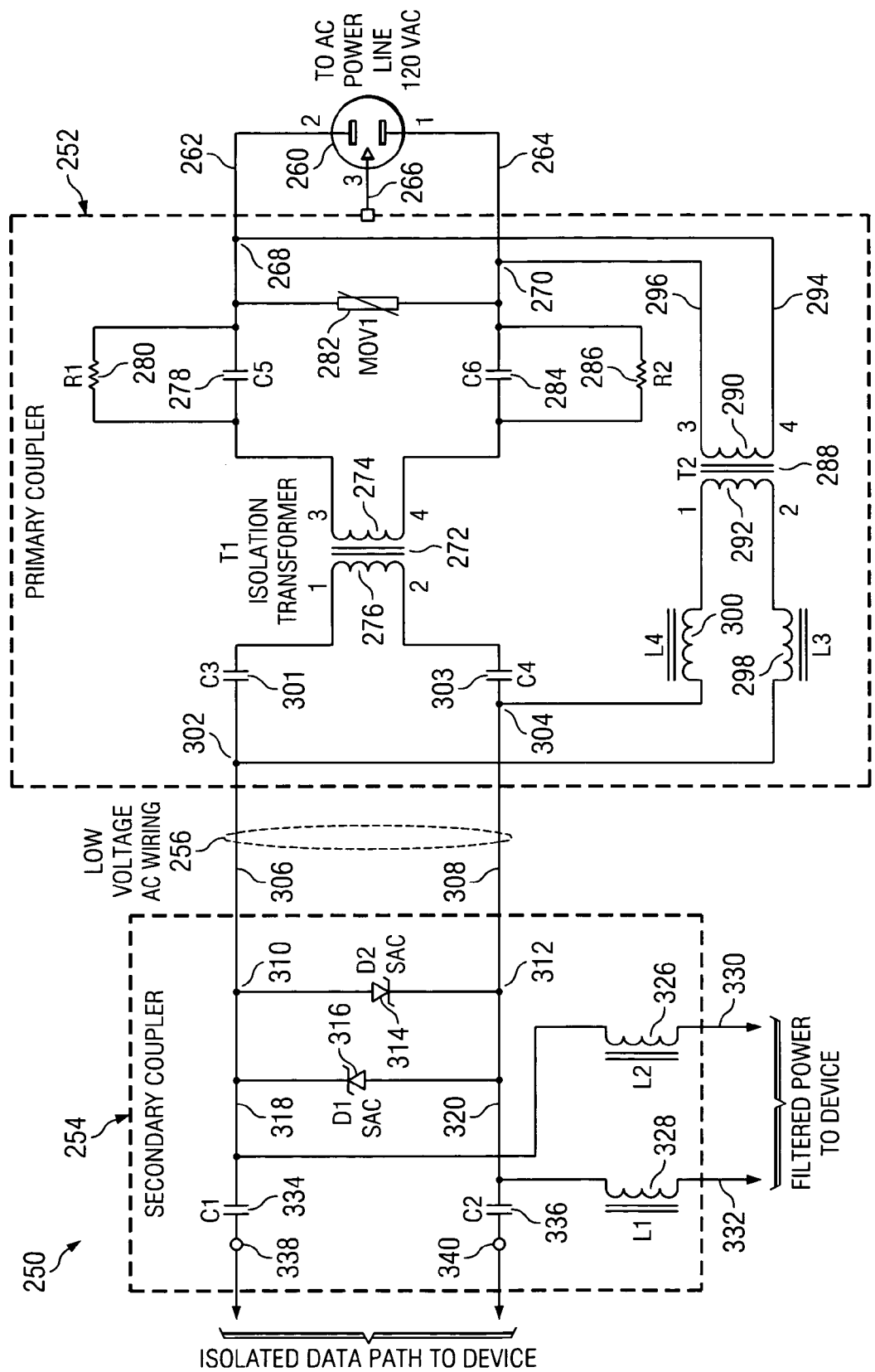
FIG. 4 illustrates a circuit diagram of one implementation of the embodiment illustrated in FIG. 2.

In a second form, the embodiments illustrated in FIGS. 2 and 4, any existing low voltage AC control or signaling circuit in a residence or other small building unit may be adapted to provide a high speed data communications link without having to install new wiring to provide the data link. In FIGS. 2 and 4, the system for converting the low voltage AC wiring circuit comprises two separate units, a primary coupler which converts the high voltage AC of the house wiring to a low voltage and provides a separate, isolated data path, is coupled between one end of the low voltage AC wiring circuit and the standard high voltage AC line in the residence. A second apparatus, called a secondary coupler, couples between the opposite end of the low voltage AC wiring circuit and provides separate terminals for the filtered, stepped-down AC voltage to power the connected device and to provide an isolated, high speed data port for the connected data device. This embodiment provides a general example of the invention that may be adapted to couple a variety of data communication devices to a low voltage AC wiring circuit.

Referring to FIG. 1, there is illustrated a block diagram of a system 10 comprising an entry unit 12 coupled to a transceiver unit 14 via a two-wire, low voltage AC line 16 used as both a high speed data link and a circuit for providing 12 to 18 Volts AC (VAC) to the entry unit 12. The transceiver unit 14 is coupled to terminals of an existing door chime transformer 18 via wires 22 and 24, and to terminals of a door chime 20 via wires 26 and 28. The connections to the door chime 20 are typically to terminals of a solenoid or other activating device that causes the chime to sound upon receiving a triggering signal. The transformer 18 is connected to the 120 VAC power line—the standard power line present in most homes in the U.S.A. today—via wires 30 and 32. Persons skilled in the art will readily note that the systems described herein may be used in residences or buildings having other AC line voltages such as 220 VAC or 240 VAC merely by revising the step-up or step-down ration of a transformer in the coupling unit, to be described. A doorbell button 34 is connected to the entry unit 12 via the wires 36 and 38. A monitor unit 40 may be provided elsewhere in the residence which receives and displays signals representing a video image transmitted from the transceiver unit 14 via the RF link 42. The RF wireless link 42 may be implemented by Wi-Fi, Bluetooth, UWB, and the like. Alternatively, the RF link 42 may be provided by a wired link (not shown in FIG. 1) as will be readily apparent to persons skilled in the art. Examples may include USB, Firewire, HomePlug®, etc.

In a conventional door chime system, the pair of wires, (which will be re-wired as the low voltage AC line 16, in the description to follow) that connect the chime unit 20 and its door chime transformer 18 (which steps down the household AC power line voltage from 120 VAC to approximately 18 VAC) forms a series circuit extending from one side of the low voltage secondary winding of the door chime transformer 18 through the SPST doorbell switch in series, and though the solenoid winding (not shown) or other activating circuit (not shown) for the door chime 20 to the other side of the low voltage secondary winding of the transformer 18. Thus, the two wires one finds in the wall of the household or residence actually provide a series path that includes the doorbell button and connects one side of the secondary winding of transformer 20 to one side of the door chime solenoid.

In the conversion of this two wire doorbell button circuit to a high speed data communications link, these two wires are wired differently—as a pair of wires that couple both sides of the secondary winding of the low voltage transformer located inside the residence to the entry unit located outside the residence near an entrance. In this way, the converted circuit—low voltage AC line 16—provides both the low voltage AC power to the entry unit and the high speed data communications link between the entry unit 12 and the transceiver unit 14. The low voltage AC line 16 may be utilized to implement any of several types of power line carrier systems for high speed data communication including, but not limited to HomePlug®, CEBus, etc. The doorbell button 34 is then re-connected to the entry unit 12 via the wires 36, 38. The advantage of this design is that no separate wiring needs to be installed in the residence to connect the entry unit device(s) outside the residence to the transceiver unit within the residence, thus eliminating a major cost factor and greatly simplifying installation, usually well within the capability of a homeowner familiar with the use of simple hand tools. The present invention also enables a variety of devices to be converted in a typical home environment without having to pull additional wiring to install the link between the units of the system being installed.

Referring to FIG. 2, there is illustrated a block diagram of a second embodiment of the present invention, a more generalized system 50 for converting a low voltage AC wiring circuit 56 to a high speed data communications link. The system 50 includes a primary coupler 52 coupled to a secondary coupler 54 via the two-wire, low voltage AC line 56 used as both a high speed data link and a circuit for providing 12 to 18 Volts AC (VAC) to a connected data device such as an entry unit 64 or other device. The upstream or high voltage side of the primary coupler 52 is coupled via wires 60, 62 to the high voltage AC power line at terminals 80, 82 respectively. The high voltage AC power line connected to the terminals 80, 82 may in turn be connected to, or have connected to it, any number of power line data communications devices, represented by a monitor (or other) unit 58, that may communicate with the entry or other unit 64. The use of the AC power line as a medium for the connection of high speed data communications devices is well known, as represented by the HomePlug®, CEBus, and other standard specifications. In the embodiments described herein, the entry unit 64 and the monitor unit 58 of FIG. 2 (as well as the corresponding structures in the other illustrative examples) may be devices that are constructed and utilized in compliance with the HomePlug® specification, for example.

Continuing with FIG. 2, the low voltage AC power provided on the line 56 may be coupled from secondary coupler 54 via the nodes 66, 68 to the entry unit 64. Similarly, the high speed data (also referred to as the RF data herein) may be coupled from the secondary coupler via the nodes 70, 72 to the entry unit 64. As will be described in conjunction with FIG. 4, the secondary coupler provides separate, isolated circuits for the low voltage (and low frequency) AC voltage and the high speed (and high frequency) data signals to the connected entry (or other) unit 64. Further, the primary coupler 52 provides both a stepped-down AC voltage to the line 56 and an isolated, bidirectional RF data path along the line 56 for use by the connected data device or entry unit 64. The entry unit 64 may be equipped with a control button 74 coupled to the entry unit 64 via first 76 and second 78 wires. Such control button 74 may be used to provide a triggering signal for operating a chime or other device.

As should be readily apparent to persons skilled in the art, the system 50 represented by the second embodiment illustrated in FIG. 2, may be adapted for many applications requiring the conversion of a low voltage AC power line or control line to a high speed data communications link. In the description accompanying FIG. 4 herein below, apparatus for one embodiment of the primary and secondary couplers 52, 54 will be described in detail. Although some of the component values are provided, persons skilled in the art will appreciate that the circuits of FIG. 4 are readily adaptable for coupling data communications devices that are operable on a low voltage AC wiring circuit to the conventional high voltage AC power line circuits, in any of the standard line voltages or frequencies available world wide.

Referring to FIG. 3, there is illustrated a block diagram of one implementation of the embodiment of FIG. 1 adapted to provide a retrofitted video entrance monitor system 100 based on a residential door chime system. The wiring for the door chime is converted to a high speed communications data link according to the present invention. The entry station 102 may include such structures as a small CMOS camera, a microphone/speaker unit, a doorbell switch, a digital encoder/decoder for audio/video signals similar to the H.323 (ITU) specification, and a DSL/home plug modem for communication via the existing home doorbell wiring. The entry station 102 may also include a simple AC/DC power supply circuit to convert the doorbell AC voltage coupled from the transceiver unit 104 via the low voltage AC line 106 to the necessary DC voltages to operate the electronics in the entry station. A battery or energy storage capacitor may be included in the entry station to retain DC voltage when the circuit is broken. The aforementioned structures and components are widely and readily available from a variety of sources and will not be described further in detail. The entry station 102 is connected to an existing terminal of the doorbell switch which leads to one terminal on the secondary side of the doorbell transformer 108 and typically supplies AC current through the doorbell button 124 for operating the solenoid (not shown) of the doorbell chime unit 110 when the doorbell button 124 is pressed.

In the illustrative embodiment of FIG. 3, the entry unit 102 is coupled via the low voltage AC wiring 106 to the secondary terminals 112, 114 of the doorbell transformer 108. The low voltage terminals of the transformer 108 are, in turn, connected respectively to terminals 190, 192 of the transceiver unit 104. The low voltage AC wiring 106 is connected to terminals 148, 150 of the entry unit 102. Within the entry unit 102, a digital encoder 140 includes a communication interface circuit 142 that is coupled to the terminals 148, 150 (and to the low voltage AC wiring 106) through isolation capacitors 144, 146. Capacitors 144, 146 permit the passage of high frequency data signals, while blocking low frequency AC power voltages. Also coupled to the terminals 148, 150 of the entry unit 102 through isolating inductors 154, 156 is a power supply 152. Power supply 152 may include an energy storage capacitor or a battery (not shown), a solar energy source, a signal-derived power source or other low voltage circuit technology as an alternative embodiment. The entry unit 102 may also include a control processor 160 coupled via a bus 166 to the encoder 140 and via a control line 174 to a video camera 170. The doorbell button 124 may be coupled to the control processor 160 via lines 162, 164 connected to the terminals 126, 128 of the entry unit 102. The control processor 160 may also be coupled to an audio transducer 176 via a control/signal line 180. The audio transducer 176, which may include a separate microphone and loudspeaker or be a single unit having a dual function, may then be coupled to the encoder via a signal line 178. In an alternative embodiment to the video camera 170 and/or the audio transducer 176, other devices or sensors such as a motion detector (not shown in FIG. 3) may be provided as an operative feature of the entry unit 102.

A transceiver unit 104, which is installed near the existing doorbell chime unit 110 within the residence may also be powered by the 18 volt (nominal) AC secondary voltage of the doorbell transformer 108. The transceiver unit 104 includes a two-way communication interface circuit coupled to the doorbell transformer secondary wiring in order to communicate audio and video data signals between itself and the entry station. The communication interface also operates as a home plug modem and has the ability to modulate and demodulate the respective signals. The transceiver unit 104 may further include a wireless transceiver system for communicating with the remotely located video monitor unit and display as described previously. The wireless link may, for example, be selected from the group of wireless communications standards including 900 megahertz, 2.4 gigahertz, 5.8 gigahertz, UWB, "Bluetooth," or WI-FI. In an alternative embodiment, the transceiver 104 and the video monitor unit 130 may each be configured as a HomePlug® unit that utilizes the AC power line as a communication medium.

In FIG. 3, the transceiver unit 104 of the illustrative embodiment includes receiving circuits 200, a power supply 212, and a transmitting circuit 230. The receiving circuits 200, which include an A-to-D data converter 202, a data receiver 204, and the communications interface circuit 206, is coupled via isolation capacitors 208, 210 to the terminals 190, 192. Also connected to the terminals 190, 192 is a power supply 212 that is connected to the terminals 190, 192 via isolating inductors 214, 216. The isolating inductors 214, 216 permit the passage of the low frequency AC power signal while blocking the high frequency data signals. An output of the A-to-D converter 200 is coupled to an input of the transmitting circuit 230 via a line 232. An output of the transmitting circuit 230 is coupled via a line 234 to an antenna 236 for transmitting the data over the RF channel medium 132 to a video monitor unit 130. The terminals 116, 118 of a chime unit, which may be an originally existing chime in the location of the system 100, may be coupled to terminals 194, 196 of the transceiver unit 104. Operating current for the chime unit may, in the illustrative embodiment, be provided by a silicon controlled rectifier (SCR) 220 having an anode connected to an output 240 of the power supply 212 and a cathode connected to the terminal 196. A gate control terminal of the SCR is connected to a control output 222 of the data receiver 204, and may, for example, be activated responsive to a data signal transmitted by the control processor 160 in the entry unit 102 when the doorbell switch 124 is pressed.

In several "hands-free" alternate embodiments, the entry unit 102 may be activated by methods or devices other than a person pressing a button such as the doorbell switch 124. For example, doorbell switch 124 may be replaced by a sensor device (not shown) responsive to motion or infra red thermal energy of a person near the entry unit 102. In another alternative embodiment, the presence of changes in the pixel content of a detected image of the video camera 170, the video camera 170 being operated in an "always on" mode, may be detected and used to provide an activation signal to the entry unit 102. The doorbell switch 124 is thus representative of various ways of providing an activation signal to the entry unit 102.

In the embodiment illustrated in FIG. 3, the structures in the entry unit 102 and the transceiver unit 104 containing the encoder 140 and the receiver/decoder 204 may be implemented using integrated circuit chips compatible with the HomePlug® 1.0 Specification. Such chips are available from Intellon Corporation (See, www.intellon.com, the INT51XX, for example) or Cogency Semiconductor, Inc. (See www.cogency.com, the CS1100, for example).

The video monitor unit 130, though it may not necessarily be part of the present invention may, for example, include a compatible wireless link receiving device (not shown) to receive the video and audio information transmitted by the wireless transceiver and to convert the signals for video or audio reproduction at the respective receiving device. The video monitor unit 130 may be provided in several ways. Although not illustrated in the present figures, each of the video monitoring devices described are well known and understood. For example, a television set may be equipped with set top box which receives the wireless signal from the transceiver and demodulates it to present the video screen and audio to the TV sound system. Similarly, a base phone may be equipped with a wireless receiving device which demodulates and provides the video and audio to the respective systems in the base phone for reproduction. If the wireless link employs a cordless phone, frequency or channel, a cordless phone equipped with a video display can easily form the interface between receiving the wireless signals from the transceiver and providing the video and audio to the person in the residence. Similarly to the television set embodiment, a personal computer may have an adjunct box which acts as a receiving device for the wireless signals form the transceiver and demodulates them for communication with the PC over a USB link.

In operation, this system is activated when a person desiring entry presses the doorbell switch 124 to activate the circuitry in the entry unit 102 and in the transceiver unit 104. Upon activation in the entry unit 102, the video camera 170 switches on and the digital encoder/decoder 140 stands by to convert video and audio signals from the entry unit 102 for transmission along the doorbell wiring circuit 106 to the transceiver unit 104 located within the residence. The signals may be coordinated with the operation of the door chime 110 or may be transmitted immediately following the release of the doorbell switch 124. Upon receiving audio and video signals from the entry unit 102, the transmitting circuit 230 in the transceiver unit 104 modulates and transmits the wireless signal to the respective monitor unit 130 for display and communication between the person at the location of the monitor unit 130 and the person at the entry unit 102. If the monitor unit 130 should be a base phone or a cordless phone and it does not include a video display, an adjunct box may be provided to convert the wireless signals from the transceiver unit 104 into video and audio for use by the telephone device.

This design for a retrofit video doorbell has several advantages. The obvious advantage is to make use of the existing doorbell wiring to provide the link between the entry unit and the existing chime and a wireless transceiver unit which is connected to the chime for both electrical power and for communication between the units. Communication signals between the transceiver and the receiving station within the residence are conducted over a wireless link selected for the purpose. This system is usable with a variety of receiving devices which may be readily and simply converted with suitable adapters to interface between the wireless signals and the particular receiving device selected by the user.

Referring to FIG. 4, there is illustrated a circuit diagram of one implementation of the primary and secondary couplers to the low voltage AC wiring of the embodiment illustrated in FIG. 2. The coupling system 250 includes a primary coupler 252 and a secondary coupler 254. The primary coupler is connected between the high voltage AC power line (e.g., 120VAC, though in some applications the power line voltage may be 240 VAC as in other countries of the world) via an AC plug 260 and a low voltage AC wiring circuit 256. The secondary coupler 254 is connected between the low voltage AC wiring circuit 256 having conductors 306, 308 and a data communications device via conductors 338, 340. As described, the low voltage AC wiring 256 may be a two-wire circuit installed within the walls, or routed in an attic or crawl space, of the building. In the example previously described, the wiring may be wiring for a doorbell circuit, or, in some installations it may be part of the control or signaling circuit of a security or HVAC system in the building.

Continuing with FIG. 4, the primary coupler 252 will be described. The AC plug 260 includes pins 262, 264 for each side of the AC line and a ground pin 266 to enable connecting the primary coupler to a three-wire AC power line circuit in the building of interest. A first pin 262 is connected to a node 268 and a second pin 264 is connected to a node 270. The ground pin 266 may be connected to a chassis terminal or to a ground reference conductor (not shown) in the circuit on the primary side of the high frequency isolation transformer 272. Connected between the node 268 and node 270 may be a transient absorbing device such as an MOV, type ERZ-VOD471. Connected between the node 268 and one side of the primary winding 274 of the high frequency isolation transformer 272 is a parallel network of a first capacitor 278 and a first resistor 280, forming a high-pass filter for the high frequency data signals. A similar high pass filter network consisting of second capacitor 284 in parallel with second resistor 286 may be connected between the node 270 and the other side of the primary winding 274. The secondary winding 276 of the high frequency isolation transformer 272 is connected on one side through a third series capacitor 301 to anode 302 and on the other side through a fourth series capacitor 303 to a node 304. The third and fourth capacitors 301, 303 provide isolation for the high frequency data signals on the secondary winding of the high frequency isolation transformer 272 from the low frequency power line voltages that also appear at nodes 302, 304 and on the low voltage AC wiring circuit 256.

The portion of the primary coupler 252 described in the preceding paragraph forms the RF or data signal isolation path of the primary coupler 252. Connected in parallel with the high frequency isolation portion of the primary coupler 252 is a step-down transformer 288 that converts the high voltage AC present at the AC plug 260 to a low voltage AC, which may typically be in the range of 12 VAC to 18 VAC, that is connected through first and second isolating inductors 298, 300 to the nodes 302, 304. The nodes 302, 304 may also function as terminals for connecting the low voltage AC wiring circuit 256 to the secondary side of the primary coupler 252. In this illustrative example, the first and second isolating inductors 298, 300 may each have an inductance value of approximately 10 microhenries (uH), which pass the low frequency AC voltages while blocking the high frequency data signals. Thus, the primary coupler 252 provides separate, parallel paths through it for the low frequency AC voltage used to provide a source of power to the data communication device connected to the secondary coupler 254 and for the high frequency data signals received and transmitted by the data communication device.

The secondary coupler 254 connected between the low voltage AC wiring circuit 256 and the data communications device (not shown in FIG. 4, but see, e.g., the entry unit 64 illustrated in FIG. 2 described herein above), provides isolated paths for the low voltage AC power and the high frequency data signals to the connected data communications device. The first and second conductors 306, 308 of the low voltage AC wiring circuit 256 are connected to nodes 310 and 312 in the secondary coupler 254. Connected between the nodes 310, 312 (and across the low voltage AC power line) are first and second clamping diodes 314, 316 connected in back-to-back fashion to limit transient energy appearing on the low voltage or secondary side of the coupling system 250. Node 310 is connected via line 318 and through high frequency bypass capacitor 334 to anode 338. Similarly, node 312 is connected via line 320 and through high frequency bypass capacitor 336 to a node 340. Lines 318, 320 form the high frequency data signal path through the secondary coupler 254 to the connected data communications device, which may be connected to the nodes 338, 340. Also connected to the nodes 310, 312 are first and second filtered paths 330, 332, which supply low voltage AC power to the connected data communications device (see entry unit 64 in FIG. 2). The first filtered path 330 is connected to node 310 via a third inductor 326; the second filtered path 332 is connected to node 312 via a fourth inductor 328. In this illustrative example, the third and fourth inductors 326, 328 may each have an inductance value of approximately 10 microhenries (uH), which pass the low frequency power line AC (corresponding to the low voltage AC) while blocking the high frequency data signals. The low voltage AC, thus filtered, is provided to the connected data communications device via the first and second filtered paths 330, 332.

A number of alternative embodiments are possible with the present invention. For example, the entry unit of FIGS. 1, 2, and 3 may be equipped with a motion detector to activate the circuitry so that it is in a ready condition to provide video and audio information before a person at the entry decides to actually press a push button announcing his or her presence. Thus, a person inside may have the ability to monitor the entry without the knowledge of the person who has triggered the motion detector.

In another embodiment, if a television receiver is used as the monitoring device within the house and the receiver is equipped with picture-in-picture (P-I-P) feature, the P-I-P feature may be used to display the video information from the entry station along with whatever programming is in play at the television set. Further, other receiving devices that provide video and audio signals may be used as substitutes for a television receiver, such as a VCR or DVD recorder which includes a television tuner.

As previously mentioned a number of alternatives are available for the frequency of the wireless link between the transceiver and the receiver in the video monitoring device. In addition, in households having a number of possible monitoring devices, the system may be configured to enable selection of a monitoring device depending upon whether the device is in use or is available for use by the retrofit doorbell system. Moreover, the system may be adapted for remote control by personal computer or integrated into a home security system in such a way as to provide additional functionality and control. An example of the latter, would be the use of the doorbell button on the entry station to activate lighting or other appliances via a home security system such as the X10 system.

While the invention has been shown in only one of its forms, it is not thus limited but is susceptible to various changes and modifications without departing from the spirit thereof.

What is claimed is:

1. Apparatus for converting a doorbell wiring circuit to a high speed data communications link, comprising:
   an entry unit coupled to the doorbell wiring circuit at an entrance of a building and further including a video camera coupled to the doorbell wiring circuit for producing a video image of a visitor at the entrance and providing a signal output on the doorbell wiring circuit; and
   a transceiver unit coupled to the doorbell wiring circuit at a location of a door chime unit in the building; the transceiver further comprising:
   a receiving circuit, for receiving the signal output from the doorbell wiring circuit and converting the signal output to wireless data; and
   a transmitting circuit for transmitting the wireless data to a monitor unit within the building.

2. The apparatus of claim 1, wherein the entry unit comprises:
   an encoder for encoding the video image from the camera into the signal output for transmission on the doorbell wiring circuit; and
   a control processor having control outputs coupled to the video camera and the encoder.

3. The apparatus of claim 2, wherein the control processor includes first and second control terminals coupled to a doorbell switch for operating the door chime.

4. The apparatus of claim 1, wherein the receiving circuit comprises:
   an interface circuit coupled between the doorbell wiring circuit and the receiving circuit; and
   a data converter having an input coupled from an output of the receiving circuit and providing a wireless data output.

5. The apparatus of claim 4, wherein the transmitting circuit comprises:
   a transmitter having an input coupled to the wireless data output and an output coupled to an antenna for emitting a wireless signal to the monitor unit within the building.

6. The apparatus of claim 1, wherein the entry unit further comprises:
   a battery for supplying operating voltages to the entry unit.

7. The apparatus of claim 1, wherein the entry unit comprises:
   an audio transducer for detecting and emitting sound at the entrance and having a sound output coupled to a sound input of the encoder.

8. The apparatus of claim 7, wherein signals present at the sound input of the encoder are combined in the encoder with the video image.

9. The apparatus of claim 1, wherein the transceiver unit is coupled to a standard AC power line via a step down transformer.

10. The apparatus of claim 9, wherein the step down transformer is an existing transformer provided with an existing low voltage AC control circuit selected from the group consisting of a doorbell chime system, a security alarm system and a HVAC system.

11. The apparatus of claim 1, wherein the entry unit further comprises a power source selected from the group consisting of solar power, signal-derived power, storage capacitor and AC line supplied power.

12. The apparatus of claim 2, wherein the control processor includes first and second control terminals coupled to a doorbell switch for activating the entry unit.

13. The apparatus of claim 2, wherein the control processor includes first and second control terminals coupled to a hands-free sensor device providing an output signal for activating the entry unit.

* * * * *